(12) United States Patent
Whitaker (10) Patent No.: US 12,324,969 B2
(45) Date of Patent: Jun. 10, 2025

(54) TEAM ROPING APPARATUS

(71) Applicant: Dustin Whitaker, Childress, TX (US)

(72) Inventor: Dustin Whitaker, Childress, TX (US)

(*) Notice: Subject to any disclaimer, the term of this patent is extended or adjusted under 35 U.S.C. 154(b) by 13 days.

(21) Appl. No.: 18/461,401

(22) Filed: Sep. 5, 2023

(65) Prior Publication Data
US 2024/0058676 A1 Feb. 22, 2024

Related U.S. Application Data

(63) Continuation-in-part of application No. 16/795,323, filed on Feb. 19, 2020, now Pat. No. 11,779,823.

(51) Int. Cl.
*A01K 15/04* (2006.01)
*A63B 69/00* (2006.01)

(52) U.S. Cl.
CPC .......... *A63B 69/0068* (2013.01); *A01K 15/04* (2013.01)

(58) Field of Classification Search
CPC ........ A01K 15/04; A01K 15/00; A01K 15/02; A63B 69/0068; A63K 3/00
See application file for complete search history.

(56) References Cited

U.S. PATENT DOCUMENTS

| | | | | |
|---|---|---|---|---|
| 4,138,966 A * | 2/1979 | Hesnault | .................. | A63K 3/00 119/701 |
| 4,286,788 A * | 9/1981 | Simington | ......... | A63B 69/0068 273/359 |
| 5,325,817 A * | 7/1994 | Huffman | ................ | A01K 15/02 119/839 |
| 5,709,386 A * | 1/1998 | Nelson | ............... | A63B 69/0068 273/338 |
| 6,497,411 B1 * | 12/2002 | Nelson | ............... | A63B 69/0068 273/338 |
| 6,629,695 B2 * | 10/2003 | Tisdell | ............... | A63B 69/0068 273/359 |
| 9,492,726 B2 | 11/2016 | Bundy | | |
| 11,779,823 B2 * | 10/2023 | Whitaker | ............... | A01K 15/04 434/225 |
| 2003/0034613 A1 * | 2/2003 | Tisdell | ............... | A63B 69/0068 273/359 |
| 2004/0101811 A1 * | 5/2004 | Gipson | .............. | A63B 69/0068 434/247 |
| 2015/0145210 A1 * | 5/2015 | Bundy | ............... | A63B 69/0068 273/359 |

* cited by examiner

*Primary Examiner* — John E Simms, Jr.
(74) *Attorney, Agent, or Firm* — Shannon Warren (57) ABSTRACT

A team roping assembly for guiding a bovine along a path between a first end and a second end of a track. Wherein: the team roping assembly comprises the track, a trolley, a horn wrap and a tether. The trolley is coupled to the track. The tether selectively connecting the horn wrap to the trolley. The horn wrap is configured to selectively attach to a head of the bovine. Said trolley 109 is slidably coupled to the track. The tether comprises the first end and the second end. Wherein, the first end of the tether is coupled to the trolley and the second end of the tether is coupled to the horn wrap on the bovine. The horn wrap comprises a protective wraps that wraps around a set of horns of the bovine to prevent rope burns and are used to reduce the risk of a horn breaking when roped.

17 Claims, 3 Drawing Sheets

TEAM ROPING APPARATUS

CROSS-REFERENCE TO RELATED APPLICATIONS

This application claims benefit to U.S. Ser. No. 16/795,323, to which this application is a continuation and which is incorporated in part.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

The prior art cited by the examiner in the prosecution of the parent application (U.S. Ser. No. 16/795,323) is known to the Applicant. Those references relied upon in examining the parent application are included in the information disclosure statement form included herewith.

For example, Bundy et al., U.S. Patent Application No. 2015/0145210. Bundy is attached to a vehicle, not a trolley controlled by one or more drive units. Bundy requires at least one party to drive the vehicle. Further, Bundy is not useful for training on live animals (steer) as is the current system. Bundy is not appropriate to demonstrate a tether, release system, or roping live animals. At best it is a track for a vehicle. The Applicant has written the claims to ensure that Bundy does not represent prior art to this application.

Bundy is attached to a vehicle, not a trolley controlled by one or more drive units. Bundy requires at least one party to drive the vehicle. Further, Bundy is not useful for training on live animals (steer) as is the current system. Bundy is not appropriate to demonstrate a tether, release system, or roping live animals. At best it is a track for a vehicle.

Likewise, Tisdell, U.S. Patent Application No. 2003/0034613, is not prior art to the current system. Tisdell comprises a track with a proxy for an animal represented by a mannequin or target.

Consider also Simington et al., U.S. Pat. No. 4,286,788. Simington does not have a live animal and is not driven by a motor at all. Rather, Simington moves a target between two points using a bicycle.

1. FIELD OF THE INVENTION

The present application relates to training equipment, and more particularly to the specialization of team roping.

2. DESCRIPTION OF RELATED ART

Team roping, also known as "heading and heeling", is a timed rodeo event that features a steer and two mounted riders. The first rider (the "Header") ropes the steer's head (ideally by the horns), "dallies" the rope by wrapping the end of the rope around a saddle horn of the header, and pulls the steer into a turned path. The second rider (the "Heeler") then ropes the steer by its hind legs as the steer arcs left, dallies the rope to the saddle horn of the heeler, and stops the heeler's horse. Once both ropes are tight and the steer is immobilized, time for the capture is recorded.

Due to the competitive nature of the sport, contestants frequently practice their roping skills for timing and accuracy. However, since the sport requires two riders, it can be difficult for the heeler to practice if the header is unavailable. Various kinds of mechanical roping steers have been developed for assisting a heeler to practice by themselves, however, these devices are stationary practicing devices and/or lack a degree of unpredictability in their mechanical nature in comparison to an actual steer. Therefore, it is desired to develop a roping training assembly that permits a heeler to train roping skills alone with a steer in an environment that simulates a header pulling the steer into a leftward arc.

It is an object of the present application to provide a team roping assembly for assisting a heeler to practice team roping without a header, the team roping assembly comprising: a track having a curved portion located between a first straight portion and a second straight portion, a barrier coupled along the track, a trolley coupled to the track wherein the trolley is permitted to translate along the track, and a tether that couples a horn wrap of a steer to the trolley.

Another object of the present application is to provide a team roping assembly alternatively having a drive motor assembly coupled proximately to an end of a track of the team roping assembly, the drive motor assembly pulling the trolley along the track.

Ultimately the invention may take many embodiments. In these ways, the present invention overcomes the disadvantages inherent in the prior art.

The more important features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present invention in detail, it is to be understood that the embodiments are not limited in its application to the details of construction and the arrangements of the components set forth in the following description or illustrated in the drawings. The embodiments are capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the various purposes of the present design. It is important, therefore, that the claims be regarded as including such equivalent constructions in so far as they do not depart from the spirit and scope of the present application.

BRIEF SUMMARY OF THE INVENTION

A team roping assembly for guiding a bovine along a path between a first end and a second end of a track. Wherein: said team roping assembly comprises said track, a trolley, a horn wrap and a tether. Said trolley is coupled to said track. Said tether selectively connecting said horn wrap to said trolley. Said horn wrap is configured to selectively attach to a head of said bovine. Said trolley 109 is slidably coupled to said track. Said tether comprises said first end and said second end. Wherein, said first end of said tether is coupled to said trolley and said second end of said tether is coupled to said horn wrap on said bovine. Said horn wrap comprises a protective wraps that wraps around a set of horns of said bovine to prevent rope burns and are used to reduce the risk of a horn breaking when roped. Said tether is configured to selectively decouple said first end from said trolley or said second end from said horn wrap. Said team roping assembly is configured to decouple said tether from said bovine by releasing said first end or said second end when said trolley presses a portion of a mechanical trigger.

Said team roping assembly for guiding said bovine along said path between said first end and said second end of said track. Wherein: said team roping assembly comprises said track, said trolley, said horn wrap and said tether. Said trolley is coupled to said track. Said tether selectively connecting said horn wrap to said trolley. Said horn wrap is configured to selectively attach to a head of said bovine. Said trolley 109 is slidably coupled to said track. Said tether comprises said first end and said second end. Wherein, said first end of said tether is coupled to said trolley and said second end of said tether is coupled to said horn wrap on said bovine. Said horn wrap comprises a protective wraps that wraps around a set of horns of said bovine to prevent rope burns and are used to reduce the risk of a horn breaking when roped.

Said team roping assembly for guiding said bovine along said path between said first end and said second end of said track. Wherein: said team roping assembly comprises said track, said trolley, said horn wrap and said tether. Said trolley is coupled to said track. Said tether selectively connecting said horn wrap to said trolley. Said horn wrap is configured to selectively attach to a head of said bovine. Said trolley 109 is slidably coupled to said track. Said tether comprises said first end and said second end. Wherein, said first end of said tether is coupled to said trolley and said second end of said tether is coupled to said horn wrap on said bovine. Said horn wrap comprises a protective wraps that wraps around a set of horns of said bovine to prevent rope burns and are used to reduce the risk of a horn breaking when roped. Said team roping assembly further comprises a barrier coupled along said track. Said trolley is configured to translate along said barrier. Said team roping assembly comprises said track having two or more straight portions and a curved portion. Said two or more straight portions comprise a first straight portion and a second straight portion. Said curved portion is located between said two or more straight portions. While using said team roping assembly, a header traditionally pulls said bovine towards a left side of the steer. Said track is configured to have an L-shape to correspond to a leftwards along said path, relative to said track, generally taken by said bovine while roped by a header during team roping. Said bovine is restricted along said path by the L-shape of said track.

BRIEF DESCRIPTION OF THE SEVERAL VIEWS OF THE DRAWING

FIG. 2 illustrates an elevated top detailed view of a first end 113*a* and a first drive motor 129*a*.

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

The assembly and method in accordance with the present invention overcomes one or more of the above-discussed problems associated with a rider practicing heeler roping without a header. In particular, the system of the present invention is a team roping assembly having a track, a trolley configured to translate along the track, and a tether connecting between the trolley and a horn wrap of a steer such that the track and trolley restrict a steer to a path that simulates a header pulling the steer for team roping, thus allowing the heeler to practice heeling with the steer without the need for a header. The system may optionally employ a plurality of pullies, a drive motor, and a cable connected to the trolley wherein the drive motor is configured to reel in the cable, thus pulling the trolley from a first end to a second end of the track such that the trolley leads the steer along the path that corresponds to the track. Furthermore, the system may optionally have the drive motor configured to reset the trolley by retracting the trolley back to the first end.

The system will be understood from the accompanying drawings, taken in conjunction with the accompanying description. Several embodiments of the system may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The system of the present application is illustrated in the associated drawings. As used herein, "system" and "assembly" are used interchangeably. It should be noted that the articles "a", "an", and "the", as used in this specification, include plural referents unless the content clearly dictates otherwise. Additional features and functions are illustrated and discussed below.

Figure 1:
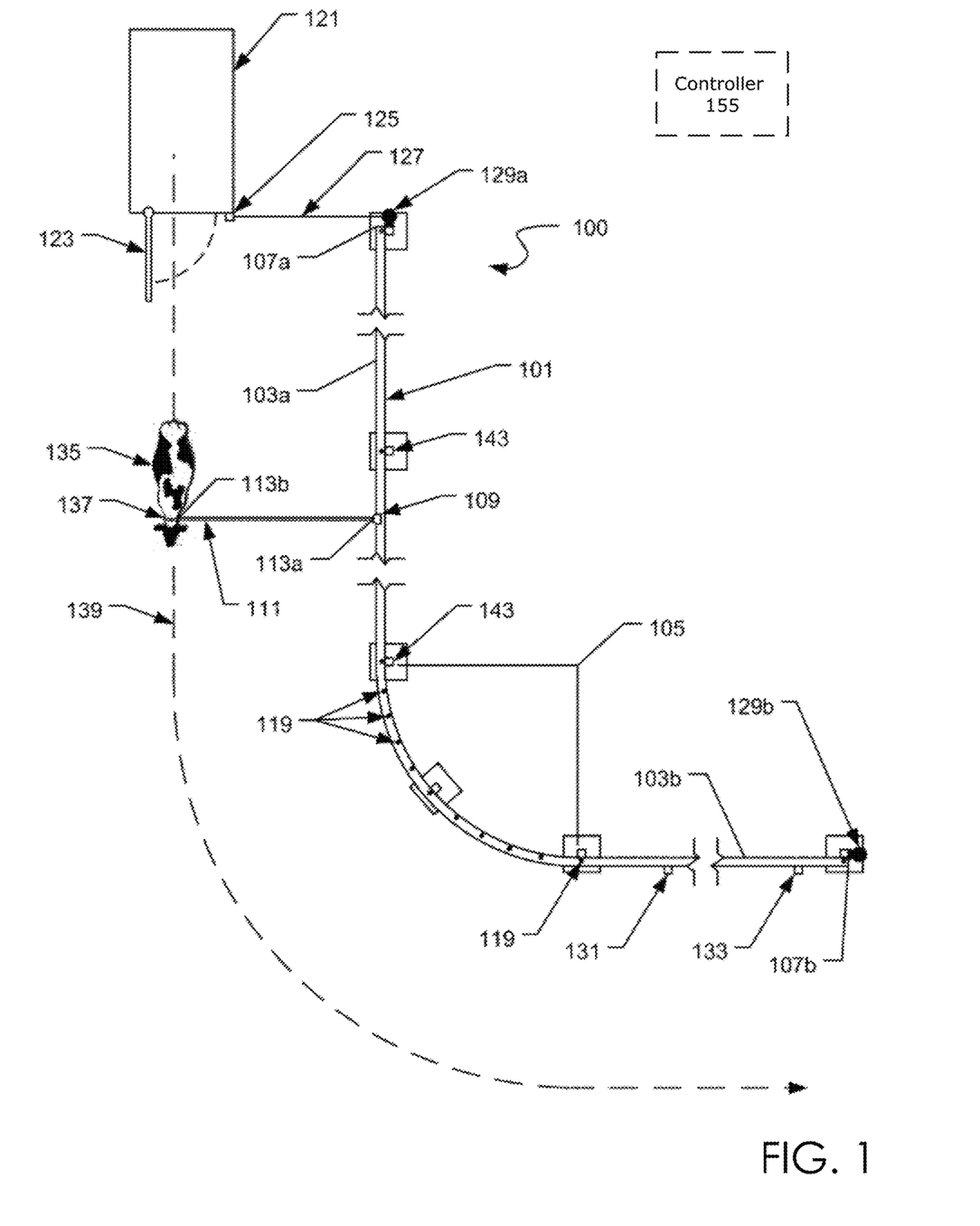
FIG. 1 illustrates an elevated top view of a team roping assembly 100 that leads a steer into an arced path for heeler practice.

FIG. 1 illustrates an elevated top view of a team roping assembly 100 that leads a steer into an arced path for heeler practice.

Referring now to FIG. 1, a top view of said team roping assembly 100 that leads a steer into an arced path for heeler practice is illustrated in accordance with an embodiment of the present invention. Said team roping assembly 100 is further referred to as said team roping assembly 100.

In one embodiment, said team roping assembly 100 comprises a track 101, a trolley 109 coupled to said track 101, a horn wrap 137, and a tether 111 selectively connecting said horn wrap 137 to said trolley 109. Said horn wrap 137 is configured to selectively attach to a head of a bovine 135.

Said team roping assembly 100 further comprises a barrier 141 coupled along said track 101. Said trolley 109 is configured to translate along said barrier 141. Said barrier 141 is further depicted and described with respect to FIGS. 2 and 3.

In one embodiment, said team roping assembly 100 comprises said track 101 having two or more straight portions 103 and a curved portion 105. Said two or more straight portions 103 comprise a first straight portion 103a and a second straight portion 103b. Said curved portion 105 can be located between said two or more straight portions 103.

In general, said track 101 is any track capable of restricting said trolley 109 to translational motion along said track 101. In one embodiment, said track 101 comprises an I-beam cross-section.

During team roping, a header traditionally pulls said bovine 135 towards a left side of the steer. Similarly, said track 101 is configured to have an L-shape to correspond to a leftwards path (i.e., A path 139), relative to said bovine 135, generally taken by said bovine 135 while roped by a header during team roping. In one embodiment, said bovine 135 is restricted along said path 139 by the L-shape of said track 101. Said curved portion 105 of said track 101 forms the L-shape. Said track 101 may assume various curvature. For instance, said curved portion 105 can be, but is not limited to, a portion of a circular curve, portion of an elliptical curve, or a portion of a parabolic curve.

In one embodiment, a plurality of posts 143 can be coupled to said track 101 to structurally support said track 101.

While said bovine 135 is generally understood to be a steer, it should be appreciated that said bovine 135 can also be any bovine animal.

Said trolley 109 can be slidably coupled to said track 101. Said trolley 109 can comprise roller bearings that permit translation along said track 101. Said trolley 109 is further depicted and illustrated in FIGS. 2 and 3.

Said team roping assembly 100 can further comprise said tether 111 having a first end 113a and a second end 113b. Said tether 111 can be configured to couple said horn wrap 137 of said bovine 135 to said trolley 109 to restrict the path of said bovine 135 to correlate to the shape of said track 101.

Said tether 111 can comprise said first end 113a and said second end 113b. wherein, said first end 113a of said tether 111 is coupled to said trolley 109 and said second end 113b of said tether 111 is coupled to said horn wrap 137 on said bovine 135.

In one embodiment, said tether 111 can made of a material selected among a solid bar, a chain, a rope. Further said tether 111 can comprise any other elongated member configured for coupling said horn wrap 137 to said trolley 109. In an exemplary embodiment, said tether 111 is approximately 10 feet long.

In general, said horn wrap 137 can comprise any horn wrap traditionally used for team roping.

In one embodiment, said horn wrap 137 can comprise a protective wrap that wraps around a set of horns of said bovine 135 to prevent rope burns and are used to reduce the risk of a horn breaking when roped.

Said tether 111 can be configured to selectively decouple said first end 113a from said trolley 109 or said second end 113b from said horn wrap 137. Said tether 111 can be configured to decouple in response to passing a sensor 131 or a mechanical trigger 133. For example, said tether 111 decouples at said first end 113a from said trolley 109 in response to passing said sensor 131.

Said team roping assembly 100 can be configured to decouple said tether 111 from said bovine 135 by releasing said first end 113a or said second end 113b when said trolley 109 passes said mechanical trigger 133.

In one embodiment, said team roping assembly 100 can comprise one or more drive motor assemblies 129, which can comprise a first drive motor 129a located at a first track end 107a and a second drive motor 129b located at a second track end 107b.

In one embodiment, said first drive motor 129a is configured to pull said trolley 109 to said second track end 107b and said second drive motor 129b pulls said trolley 109 to said first track end 107a.

In general, said one or more drive motor assemblies 129 can comprise a variable drive motor having a motor shaft, and a cable spool coupled to the motor shaft wherein the cable spool is further coupled to the trolley via a cable. When engaged, said one or more drive motor assemblies 129 can pull said trolley 109 by retracting the cable into the cable spool by the motor drive reeling the cable spool via the motor shaft. Said one or more drive motor assemblies 129 is further depicted and described with regards to FIGS. 2 and 3. Furthermore, said team roping assembly 100 may optionally have a plurality of pullies 119 to facilitate the cable coupling between the cable spool and said trolley 109. Said plurality of pullies 119 are located proximate to said track 101 and are coupled to the barrier. Said plurality of pullies 119 may also be positioned proximately along said curved portion 105 to prevent the cable from rubbing against the barrier. Said plurality of pullies 119 are further depicted and described with regards to FIGS. 2 and 3.

In one embodiment, said team roping assembly 100 can comprise said one or more drive motor assemblies 129 in communication with said sensor 131 that transmit a signal to a controller 155. Wherein, said controller 155 is to engage, disengage, reverse, or brake said one or more drive motor assemblies 129.

For example, in FIG. 1, a stock 121 has a stock gate 123 that temporarily houses said bovine 135. Said stock 121 is a traditional stock; wherein said stock 121 is sometimes referred to as a squeeze chute generally known in the art of livestock pens. Said stock 121 can comprise a stock sensor 125 that detects and transmits a signal when said stock gate 123 is opened. Responsive to opening said stock gate 123, said one or more drive motor assemblies 129 a receives the signal from said stock sensor 125 via a network 127. While said network 127 is depicted as a wired connection, it should be appreciated that said stock sensor 125, said first drive motor 129a and said second drive motor 129b may alternatively communicate via wireless transmission.

In one embodiment, said team roping assembly 100 can comprise said sensor 131 located proximate to said second straight portion 103b of said track 101. Wherein, said team roping assembly 100 can be configured for: detecting when said trolley 109 passes said sensor 131, transmitting a signal to said controller 155 associated with said one or more drive motor assemblies 129, stopping said trolley 109 from moving along said track 101. In one embodiment, said controller 155 can control either or both of said first drive motor 129a and said second drive motor 129b. Further, stopping said trolley 109 can comprise engaging or disengaging a brake associated with said trolley 109. In another embodiment, stopping said trolley 109 can comprise slowing and stopping a cable attached to 128/. Wherein, sufficient force in said one or more drive motor assemblies 129 and/or a brake is required to stop said bovine 135.

In one embodiment, said team roping assembly 100 can be configured to decouple said trolley 109 from said bovine 135; thereby releasing said bovine 135 from said team roping assembly 100. For example, said team roping assembly 100 may decouple said first end 113a of said tether 111 from said trolley 109, or decouple said second end 113b of said tether 111 from said horn wrap 137.

Figure 2:
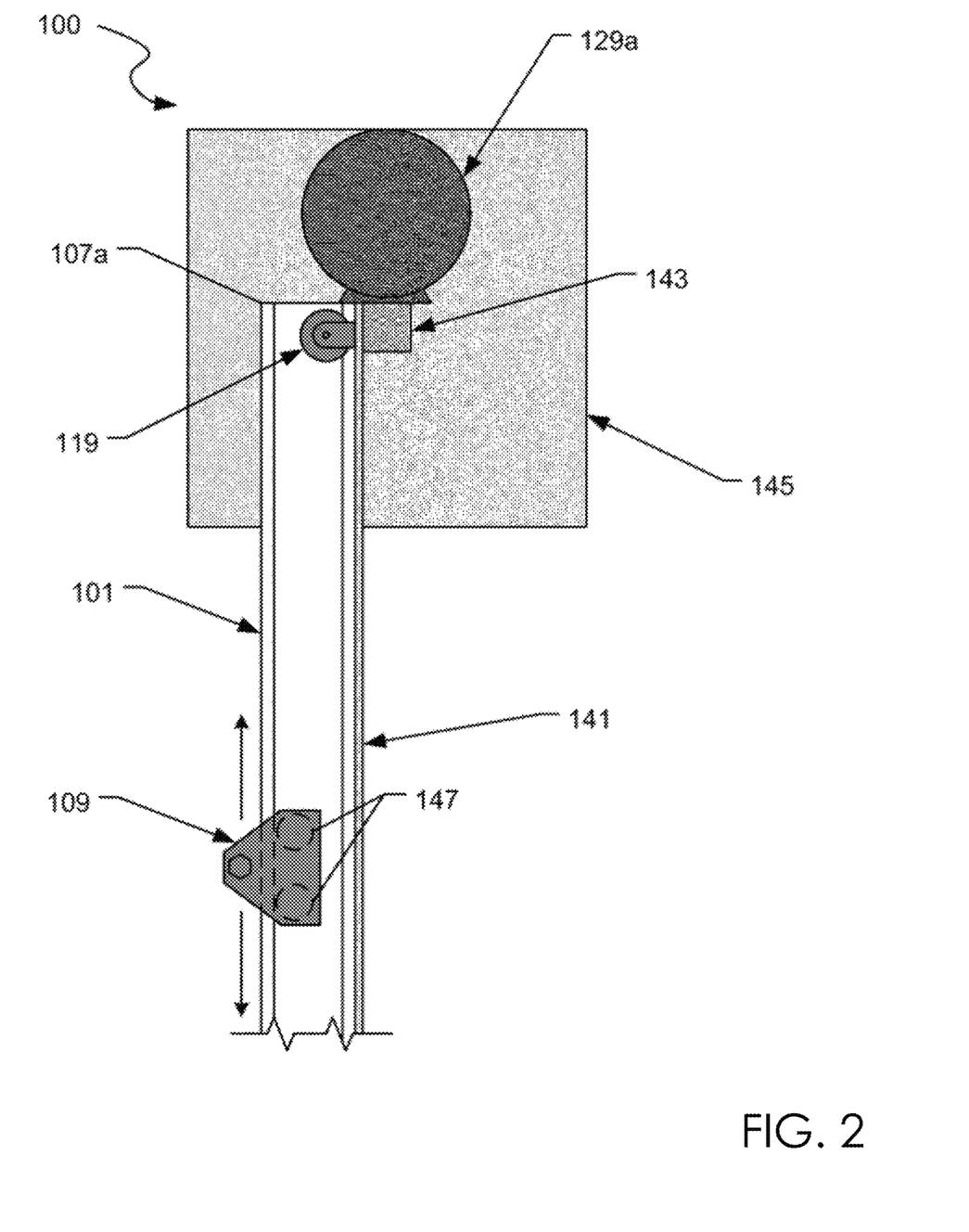

FIG. 2 illustrates an elevated top detailed view of said first end 113a and said first drive motor 129a.

In one embodiment, said trolley 109 is configured to translate along said track 101 via a plurality of rollers 147. In one embodiment, said plurality of rollers 147 comprise roller bearings. Said barrier 141 can be coupled along said track 101. In one embodiment, said barrier 141 can comprise any barrier that deters said bovine 135 from passing across said track 101. For example, said barrier 141 can be sheet metal, a structural wall, agricultural fencing, or livestock fencing. In this figure, said plurality of pullies 119 are coupled to said barrier 141.

In general, said plurality of posts 143 are coupled to said track 101 to structurally support said track 101. Wherein, said plurality of posts 143 are coupled to said track 101 and subsequently said barrier 141. Further, said one or more drive motor assemblies 129 is proximate to said first end 113a by being coupled to said plurality of posts 143.

Figure 3:
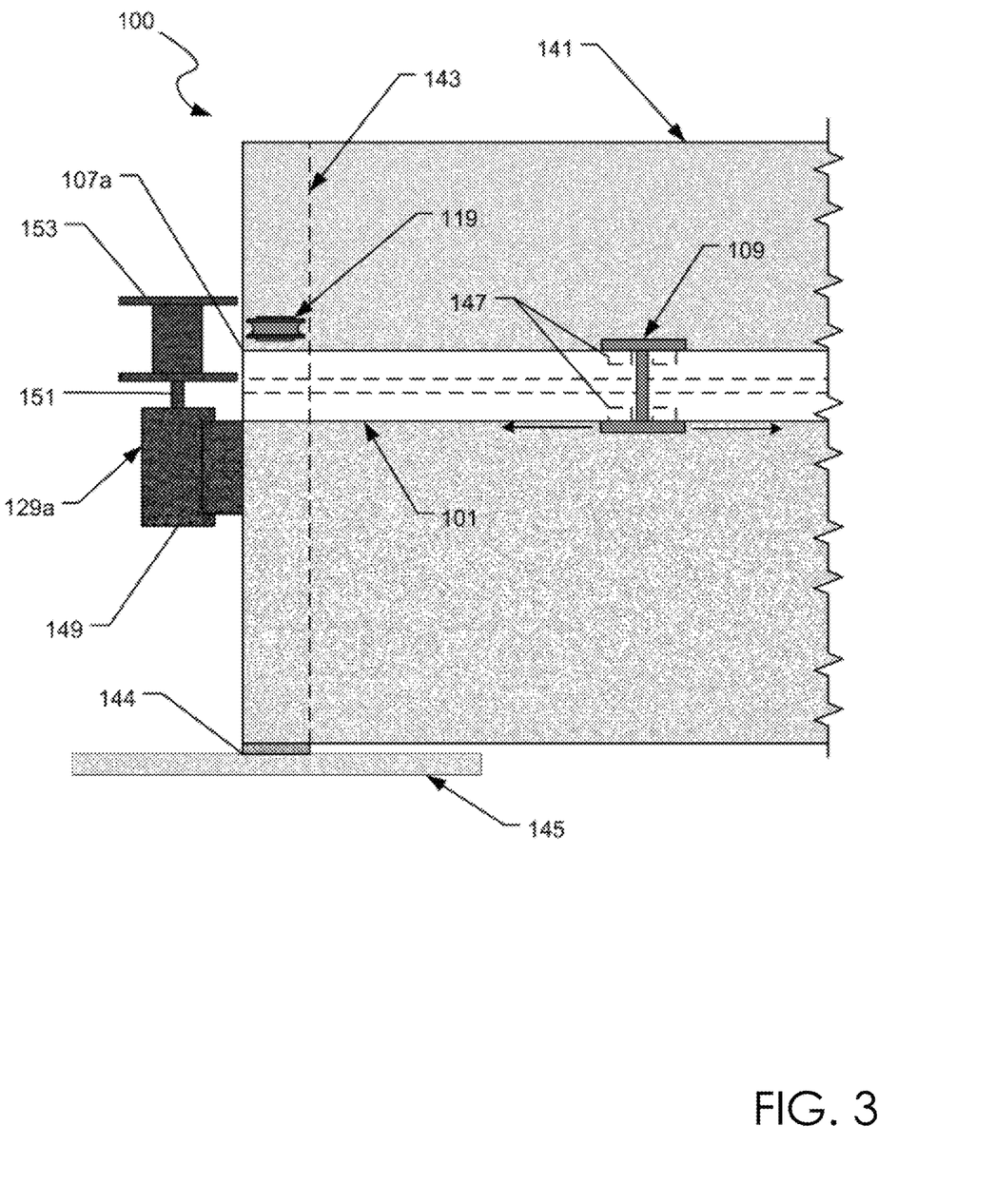
FIG. 3 illustrates elevated side view of said first end 113*a* of said team roping assembly 100.

FIG. 3 illustrates elevated side view of said first end 113a of said team roping assembly 100.

Each among said one or more drive motor assemblies 129 can comprise a variable drive motor 149, a motor shaft 151, and a cable spool 153.

While FIGS. 2 and 3 depict said one or more drive motor assemblies 129 a being coupled proximate to said first track end 107a by being coupled to said plurality of posts 143, it should be appreciated that said second drive motor 129b (having the same form and function as said first drive motor 129a) can be coupled to a post located proximate to said second track end 107b of said track 101 in the same form and fashion as said first drive motor 129a.

Optionally, each among said plurality of posts 143 can comprise a base member 145 integrally connected to an end of each post to maintain vertical orientation of each post relative to a foundation (e.g., ground). In this figure, said base member 145 is integrally connected to an end 144 of a post 145.

Various changes in the details of the illustrated operational methods are possible without departing from the scope of the following claims. Some embodiments may combine the activities described herein as being separate steps. Similarly, one or more of the described steps can be omitted, depending upon the specific operational environment the method is being implemented in. It is to be understood that the above description is intended to be illustrative, and not restrictive. For example, the above-described embodiments can be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

SUMMARY OF THE PARTS said team roping assembly 100,
said track 101,
said trolley 109,
said horn wrap 137,
said tether 111,
said bovine 135,
said barrier 141,
said two or more straight portions 103,
said curved portion 105,
said first straight portion 103a,
said second straight portion 103b,
said path 139,
said plurality of posts 143,
said first end 113a,
said second end 113b,
said sensor 131,
said mechanical trigger 133,
said one or more drive motor assemblies 129,
said first drive motor 129a,
said first track end 107a,
said second drive motor 129b,
said second track end 107b,
said plurality of pullies 119,
said controller 155,
said stock 121,
said stock gate 123,
said stock sensor 125,
said network 127,
said plurality of rollers 147, said variable drive motor 149,
said motor shaft 151,
said cable spool 153,
said base member 145,
said end 144, and
said post 145.

Preferred Embodiment said team roping assembly 100 for guiding said bovine 135 along said path 139 between said first end 113a and said second end 113b of said track 101. Wherein: said team roping assembly 100 comprises said track 101, said trolley 109, said horn wrap 137 and said tether 111. Said trolley 109 can be coupled to said track 101. Said tether 111 selectively connecting said horn wrap 137 to said trolley 109. Said horn wrap 137 can be configured to selectively attach to a head of said bovine 135. Said trolley 109 can be slidably coupled to said track 101. Said tether 111 comprises said first end 113a and said second end 113b. Wherein, said first end 113a of said tether 111 can be coupled to said trolley 109 and said second end 113b of said tether 111 can be coupled to said horn wrap 137 on said bovine 135. Said horn wrap 137 comprises a protective wraps that wraps around a set of horns of said bovine 135 to prevent rope burns and can be used to reduce the risk of a horn breaking when roped. Said tether 111 can be configured to selectively decouple said first end 113a from said trolley 109 or said second end 113b from said horn wrap 137. Said team roping assembly 100 can be configured to decouple said tether 111 from said bovine 135 by releasing said first end 113a or said second end 113b when said trolley 109 presses a portion of said mechanical trigger 133.

Said team roping assembly 100 for guiding said bovine 135 along said path 139 between said first end 113a and said second end 113b of said track 101. Wherein: said team roping assembly 100 comprises said track 101, said trolley 109, said horn wrap 137 and said tether 111. Said trolley 109 can be coupled to said track 101. Said tether 111 selectively connecting said horn wrap 137 to said trolley 109. Said horn wrap 137 can be configured to selectively attach to a head of said bovine 135. Said trolley 109 can be slidably coupled to said track 101. Said tether 111 comprises said first end 113a and said second end 113b. Wherein, said first end 113a of said tether 111 can be coupled to said trolley 109 and said second end 113b of said tether 111 can be coupled to said horn wrap 137 on said bovine 135. Said horn wrap 137 comprises a protective wraps that wraps around a set of horns of said bovine 135 to prevent rope burns and can be used to reduce the risk of a horn breaking when roped. Said tether 111 can be configured to selectively decouple said first end 113a from said trolley 109 or said second end 113b from said horn wrap 137. Said team roping assembly 100 can be configured to decouple said tether 111 from said bovine 135 by releasing said first end 113a or said second end 113b when said trolley 109 presses a portion of said mechanical trigger 133.

Said team roping assembly 100 for guiding said bovine 135 along said path 139 between said first end 113a and said second end 113b of said track 101. Wherein: said team roping assembly 100 comprises said track 101, said trolley 109, said horn wrap 137 and said tether 111. Said trolley 109 can be coupled to said track 101. Said tether 111 selectively connecting said horn wrap 137 to said trolley 109. Said horn wrap 137 can be configured to selectively attach to a head of said bovine 135. Said trolley 109 can be slidably coupled to said track 101. Said tether 111 comprises said first end 113a and said second end 113b. Wherein, said first end 113a of said tether 111 can be coupled to said trolley 109 and said second end 113b of said tether 111 can be coupled to said horn wrap 137 on said bovine 135. Said horn wrap 137 comprises a protective wraps that wraps around a set of horns of said bovine 135 to prevent rope burns and can be used to reduce the risk of a horn breaking when roped.

Said team roping assembly 100 further comprises said barrier 141 coupled along said track 101. Said trolley 109 can be configured to translate along said barrier 141.

Said team roping assembly 100 comprises said track 101 having said two or more straight portions 103 and said curved portion 105. Said two or more straight portions 103 comprise said first straight portion 103a and said second straight portion 103b. Said curved portion 105 can be located between said two or more straight portions 103.

While using said team roping assembly 100, a header traditionally pulls said bovine 135 towards a left side of the steer. Said track 101 can be configured to have an L-shape to correspond to a leftwards along said path 139, relative to said track 101, generally taken by said bovine 135 while roped by a header during team roping. Said bovine 135 can be restricted along said path 139 by the L-shape of said track 101.

Said track 101 comprises an I-beam cross-section.

Said team roping assembly 100 further comprises said plurality of posts 143. Said plurality of posts 143 can be coupled to said track 101 to structurally support said track 101.

Said trolley 109 comprises roller bearings that permit translation along said track 101.

Said tether 111 can made of a material selected among a solid bar, a chain, a rope.

Said tether 111 can be approximately 10 feet long.

Said tether 111 can be configured to selectively decouple said first end 113a from said trolley 109 or said second end 113b from said horn wrap 137. Said team roping assembly 100 can be configured to decouple said tether 111 from said bovine 135 by releasing said first end 113a or said second end 113b when said trolley 109 presses a portion of said mechanical trigger 133.

Said team roping assembly 100 comprises said one or more drive motor assemblies 129 in communication with said sensor 131 that transmit a signal to said controller 155. Said controller 155 can be to engage, disengage, reverse, or brake said one or more drive motor assemblies 129 upon receiving a signal from said sensor 131.

Said team roping assembly 100 comprises said sensor 131 located proximate to said second straight portion 103b of said track 101. Said team roping assembly 100 can be configured for: detecting when said trolley 109 passes said sensor 131, transmitting a signal to said controller 155 associated with said one or more drive motor assemblies 129, and stopping said trolley 109 from moving along said track 101. Said controller 155 can control a portion of said one or more drive motor assemblies 129.

Stopping said trolley 109 comprises engaging or disengaging a brake associated with said trolley 109.

Stopping said trolley 109 comprises slowing and stopping a cable attached to said one or more drive motor assemblies 129.

Said trolley 109 can be configured to translate along said track 101 via a said plurality of rollers 147. Said plurality of rollers 147 comprise roller bearings. Said barrier 141 can be coupled along said track 101. Said barrier 141 comprises any barrier that deters said bovine 135 from passing across said track 101. Said plurality of posts 143 can be coupled to said track 101 to structurally support said track 101. Said plurality of posts 143 can be coupled to said track 101 and subsequently said barrier 141. Said one or more drive motor assemblies 129 can be proximate to said first end 113a by being coupled to said plurality of posts 143.

Each among said one or more drive motor assemblies 129 comprises said variable drive motor 149, said motor shaft 151, and said cable spool 153.

The invention claimed is:

1. A team roping assembly for guiding a bovine along a path between a first end and a second end of a track; wherein:
   said team roping assembly comprises said track, a trolley, a horn wrap and a tether;
   said trolley is coupled to said track;
   said tether selectively connecting said horn wrap to said trolley;
   said horn wrap is configured to selectively attach to a head of said bovine;
   said trolley is slidably coupled to said track;
   said tether comprises said first end and said second end;
   wherein, said first end of said tether is coupled to said trolley and said second end of said tether is coupled to said horn wrap on said bovine;
   said horn wrap comprises a protective wraps that wraps around a set of horns of said bovine to prevent rope burns and are used to reduce the risk of a horn breaking when roped;
   said tether is configured to selectively decouple said first end from said trolley by releasing said first end; and
   said tether is configured to selectively decouple said second end from said horn wrap when said trolley presses a portion of a mechanical trigger.

2. A team roping assembly for guiding a bovine along a path between a first end and a second end of a track; wherein:
   said team roping assembly comprises said track, a trolley, a horn wrap and a tether;
   said trolley is coupled to said track;
   said tether selectively connecting said horn wrap to said trolley;
   said horn wrap is configured to selectively attach to a head of said bovine;
   said trolley is slidably coupled to said track;
   said tether comprises said first end and said second end;
   wherein, said first end of said tether is coupled to said trolley and said second end of said tether is coupled to said horn wrap on said bovine; and
   said horn wrap comprises a protective wraps that wraps around a set of horns of said bovine to prevent rope burns and are used to reduce the risk of a horn breaking when roped.

3. The team roping assembly of claim 2, wherein:
   said team roping assembly further comprises a barrier coupled along said track; and
   said trolley is configured to translate along said barrier.

4. The team roping assembly of claim 2, wherein:
   said team roping assembly comprises said track having two or more straight portions and a curved portion;
   said two or more straight portions comprise a first straight portion and a second straight portion; and
   said curved portion is located between said two or more straight portions.

5. The team roping assembly of claim 4, wherein:
   while using said team roping assembly, a header traditionally pulls said bovine towards a left side of the steer;
   said two or more straight portions and said curved portion of said track correspond to a leftwards shape of said path generally taken by said bovine while roped by a header during team roping; and
   said bovine is restricted along said path by the shape of said track.

6. The team roping assembly of claim 2, wherein:
   said track comprises an I-beam cross-section.

7. The team roping assembly of claim 2, wherein:
   said team roping assembly further comprises a plurality of posts; and
   said plurality of posts are coupled to said track to structurally support said track.

8. The team roping assembly of claim 2, wherein:
   said trolley comprises roller bearings that permit translation along said track.

9. The team roping assembly of claim 2, wherein:
   said tether can made of a material selected among a solid bar, a chain, a rope.

10. The team roping assembly of claim 2, wherein:
    said tether is approximately 10 feet long.

11. The team roping assembly of claim 2, wherein:
    said team roping assembly comprises one or more drive motor assemblies in communication with a sensor that transmit a signal to a controller; and
    said controller is to engage, disengage, reverse, or brake said one or more drive motor assemblies upon receiving a signal from said sensor.

12. The team roping assembly of claim 2, wherein:
    said team roping assembly comprises said sensor located proximate to said second straight portion of said track;
    said team roping assembly is configured for:
      detecting when said trolley passes said sensor,
      transmitting a signal to said controller associated with said one or more drive motor assemblies, and
      stopping said trolley from moving along said track; and
    said controller can control a portion of said one or more drive motor assemblies.

13. The team roping assembly of claim 12, wherein:
    stopping said trolley comprises engaging or disengaging a brake associated with said trolley.

14. The team roping assembly of claim 12, wherein:
    stopping said trolley comprises slowing and stopping a cable attached to said one or more drive motor assemblies.

15. The team roping assembly of claim 2, wherein:
    said trolley is configured to translate along said track via a plurality of rollers;
    said plurality of rollers comprise roller bearings;
    said barrier is coupled along said track;
    said barrier comprises any barrier that deters said bovine from passing across said track;
    said plurality of posts are coupled to said track to structurally support said track;
    said plurality of posts are coupled to said track and subsequently said barrier; and
    said one or more drive motor assemblies is proximate to said first end by being coupled to said plurality of posts.

16. The team roping assembly of claim 2, wherein:
    each among said one or more drive motor assemblies comprises a variable drive motor, a motor shaft, and a cable spool.

17. A team roping assembly for guiding a bovine along a path between a first end and a second end of a track; wherein:
    said team roping assembly comprises said track, a trolley, a horn wrap and a tether;

said trolley is coupled to said track;
said tether selectively connecting said horn wrap to said trolley;
said horn wrap is configured to selectively attach to a head of said bovine;
said trolley is slidably coupled to said track;
said tether comprises said first end and said second end;
wherein, said first end of said tether is coupled to said trolley and said second end of said tether is coupled to said horn wrap on said bovine;
said horn wrap comprises a protective wraps that wraps around a set of horns of said bovine to prevent rope burns and are used to reduce the risk of a horn breaking when roped;
said team roping assembly further comprises a barrier coupled along said track;
said trolley is configured to translate along said barrier;
said team roping assembly comprises said track having two or more straight portions and a curved portion;
said two or more straight portions comprise a first straight portion and a second straight portion;
said curved portion is located between said two or more straight portions;
while using said team roping assembly, a header traditionally pulls said bovine towards a left side of the steer;
said two or more straight portions and said curved portion of said track correspond to a leftwards shape of said path generally taken by said bovine while roped by a header during team roping; and
said bovine is restricted along said path by the shape of said track.

* * * * *